United States Patent [19]

Blackmore

[11] Patent Number: 5,451,351

[45] Date of Patent: Sep. 19, 1995

[54] METHOD FOR REHABILITATING A PIPE WITH A LINER HAVING AN ELECTRICALLY CONDUCTIVE LAYER

[75] Inventor: Richard D. Blackmore, Northbrook, Ill.

[73] Assignee: Composite Components, Inc., Wheeling, Ill.

[21] Appl. No.: 759,419

[22] Filed: Sep. 13, 1991

[51] Int. Cl.⁶ .................. B29C 63/28; B29C 63/34
[52] U.S. Cl. .................................. 264/449; 138/97; 156/95; 156/287; 156/294; 264/36; 264/516; 264/269; 264/496
[58] Field of Search ............. 264/27, 36, 516, 269; 156/94, 287, 294, 95; 138/97

[56] References Cited

U.S. PATENT DOCUMENTS

| | | |
|---|---|---|
| Re. 27,144 | 6/1971 | Rubenstein . |
| 1,778,183 | 10/1930 | Burke . |
| 2,489,643 | 11/1949 | Hunter . |
| 2,794,758 | 6/1957 | Harper et al. . |
| 3,028,284 | 4/1962 | Reeves . |
| 3,050,786 | 8/1962 | St. John et al. . |
| 3,061,496 | 10/1962 | Meyer . |
| 3,093,160 | 6/1963 | Boggs . |
| 3,123,101 | 3/1964 | Blount et al. . |
| 3,132,062 | 5/1964 | Lang et al. . |
| 3,230,129 | 1/1966 | Kelly . |
| 3,239,403 | 3/1966 | Williams et al. . |
| 3,250,654 | 5/1966 | Rubenstein . |
| 3,277,419 | 10/1966 | Butz . |
| 3,307,996 | 3/1967 | Keneipp, Jr. . |
| 3,340,115 | 9/1967 | Rubenstein . |
| 3,396,545 | 8/1968 | Lamberton . |
| 3,412,891 | 11/1968 | Bastone et al. . |
| 3,424,203 | 1/1969 | Rubenstein . |
| 3,494,813 | 2/1970 | Lawrence et al. . |
| 3,509,725 | 5/1970 | Schnabel, Jr. . |
| 3,511,734 | 5/1970 | Darrow . |
| 3,524,320 | 8/1970 | Turzillo . |
| 3,560,295 | 2/1971 | Kimbrell et al. . |
| 3,593,391 | 7/1971 | Routh . |
| 3,679,534 | 7/1972 | Weinberg . |
| 3,726,817 | 4/1973 | Niswonger . |
| 3,773,593 | 11/1973 | Casadevall et al. . |
| 3,823,565 | 7/1974 | Takada . |
| 3,859,504 | 1/1975 | Motokawa et al. . |
| 3,900,654 | 8/1975 | Stinger . |
| 3,950,461 | 4/1976 | Levens . |
| 3,960,644 | 6/1976 | McFadden . |
| 3,964,958 | 6/1976 | Johnston . |
| 3,971,416 | 7/1976 | Johnson . |
| 3,996,967 | 12/1976 | Takada . |
| 4,009,063 | 2/1977 | Wood . |
| 4,035,543 | 7/1977 | Draper et al. . |
| 4,055,526 | 10/1977 | Kiyokawa et al. . |
| 4,058,704 | 11/1977 | Shimizu . |
| 4,064,211 | 12/1977 | Wood . |
| 4,104,095 | 8/1978 | Shaw . |
| 4,135,958 | 1/1979 | Wood . |

(List continued on next page.)

FOREIGN PATENT DOCUMENTS

| | | |
|---|---|---|
| 28745/84 | 6/1984 | Australia . |
| 64960/86 | 5/1990 | Australia . |
| 37197/89 | 7/1991 | Australia . |
| 0351570 | 6/1989 | European Pat. Off. . |
| 2542416 | 3/1983 | France . |
| 2542416 | 9/1984 | France . |
| 2832547 | 2/1980 | Germany . |

OTHER PUBLICATIONS

"Pipeline Reconstruction and Rehabilitation Technology Comparison", James B. Hinte, P.E. (undated).
"The Potential Market For Pipeline Rehabilitation In North America", Roy C. Fedotoff, P.E. (undated).

Primary Examiner—Mathieu D. Vargot
Attorney, Agent, or Firm—Willian Brinks Hofer Gilson & Lione

[57] ABSTRACT

A lining and method for in situ rehabilitation of a pipe. The lining includes a tubular shaped resin impregnated composite having a conductive layer surrounding an inflatable bladder. The method includes the steps of positioning the lining within a pipe section, inflating the bladder until the lining is in contiguous contact with the interior of the pipe and inducing an electric current through the conductive layer to resistively heat the lining and cure the impregnated resin.

14 Claims, 3 Drawing Sheets

U.S. PATENT DOCUMENTS

| | | |
|---|---|---|
| 4,233,101 | 11/1980 | Scragg et al. . |
| 4,250,397 | 2/1981 | Gray et al. . |
| 4,250,398 | 2/1981 | Ellis et al. . |
| 4,273,605 | 6/1981 | Ross . |
| 4,284,451 | 8/1981 | Conley . |
| 4,289,172 | 9/1981 | Ekstrom . |
| 4,314,144 | 2/1982 | Wojtecki et al. . |
| 4,323,526 | 4/1982 | Hilbush, III . |
| 4,325,772 | 4/1982 | Suetoshi et al. . |
| 4,334,943 | 6/1982 | Zenbayashi et al. . |
| 4,347,018 | 8/1982 | Wrightson et al. . |
| 4,350,548 | 9/1982 | Zenbayashi et al. . |
| 4,361,451 | 11/1982 | Renaud . |
| 4,368,091 | 1/1983 | Ontsuga et al. . |
| 4,385,885 | 5/1983 | Wood . |
| 4,386,628 | 6/1983 | Stanley . |
| 4,390,574 | 6/1983 | Wood . |
| 4,394,202 | 7/1983 | Thomas et al. . |
| 4,401,696 | 8/1983 | Wood . |
| 4,409,270 | 10/1983 | Faber et al. . |
| 4,410,391 | 10/1983 | Thomas et al. . |
| 4,427,480 | 1/1984 | Kamuro et al. . |
| 4,428,989 | 1/1984 | Marshall . |
| 4,434,115 | 2/1984 | Chick . |
| 4,439,469 | 3/1984 | Wood . |
| 4,442,891 | 4/1984 | Wood . |
| 4,446,181 | 5/1984 | Wood . |
| 4,456,401 | 6/1984 | Williams . |
| 4,496,499 | 1/1985 | Brittain et al. . |
| 4,505,613 | 3/1985 | Koga . |
| 4,532,164 | 7/1985 | Claunch, II et al. . |
| 4,560,428 | 12/1985 | Sherrick et al. . |
| 4,577,388 | 3/1986 | Wood . |
| 4,581,085 | 4/1986 | Wood . |
| 4,600,615 | 7/1986 | Hyodo et al. . |
| 4,622,196 | 11/1986 | Wood . |
| 4,627,472 | 12/1986 | Goettler et al. . |
| 4,637,754 | 1/1987 | Wood . |
| 4,639,545 | 1/1987 | Pithouse et al. . |
| 4,670,315 | 6/1987 | Hillemeier et al. . |
| 4,671,840 | 6/1987 | Renaud . |
| 4,680,066 | 7/1987 | Wood . |
| 4,681,783 | 7/1987 | Hyodo et al. . |
| 4,684,556 | 8/1987 | Ohtsuga et al. . |
| 4,686,126 | 8/1987 | Hyodo et al. . |
| 4,688,605 | 8/1987 | Eisenzimmer et al. . |
| 4,691,740 | 9/1987 | Svetlik et al. . |
| 4,701,988 | 10/1987 | Wood . |
| 4,723,579 | 2/1988 | Hyodo et al. ................ 138/124 |
| 4,724,178 | 2/1988 | Hyodo et al. . |
| 4,752,511 | 6/1988 | Driver . |
| 4,758,454 | 7/1988 | Wood . |
| 4,768,562 | 9/1988 | Strand . |
| 4,770,562 | 9/1988 | Müller et al. . |
| 4,777,984 | 10/1988 | Storah . |
| 4,778,553 | 10/1988 | Wood . |
| 4,786,345 | 11/1988 | Wood . |
| 4,836,715 | 6/1989 | Wood ............................ 405/150 |
| 4,855,173 | 8/1989 | Dore . |
| 4,867,921 | 9/1989 | Steketee, Jr. . |
| 4,877,665 | 10/1989 | Higuchi et al. . |
| 4,921,648 | 5/1990 | Soni et al. . |
| 4,972,880 | 11/1990 | Strand . |
| 5,010,440 | 4/1992 | Endo ............................ 361/215 |
| 5,017,258 | 5/1991 | Brown et al. .................. 156/294 |
| 5,077,107 | 12/1991 | Kaneda et al. . |

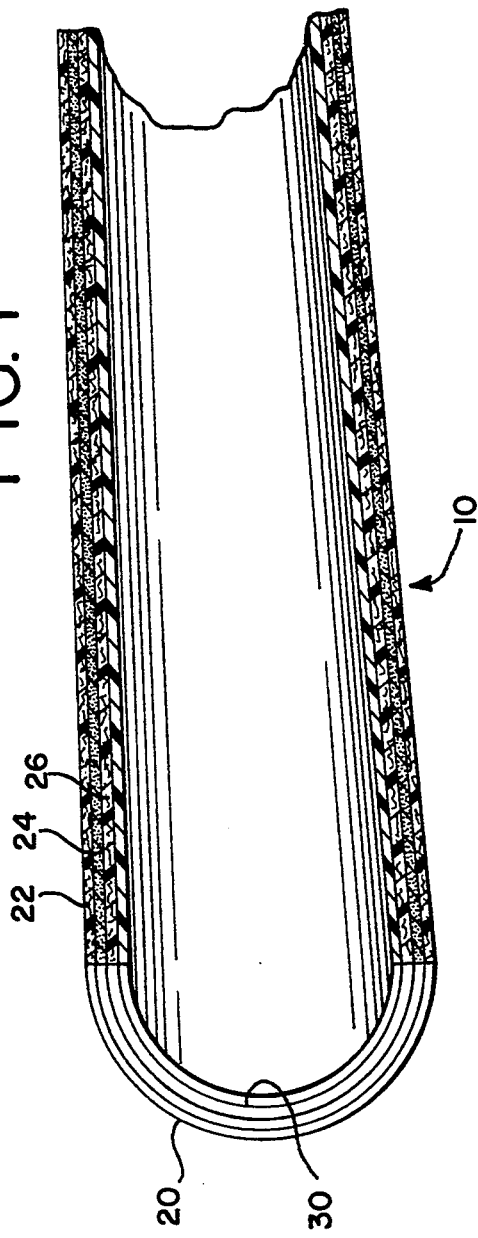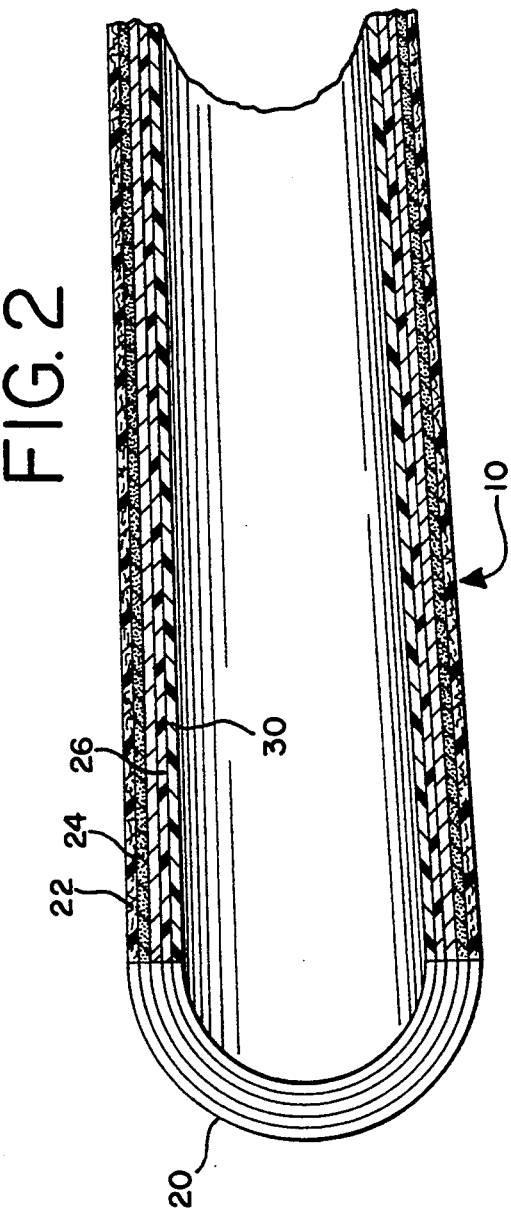

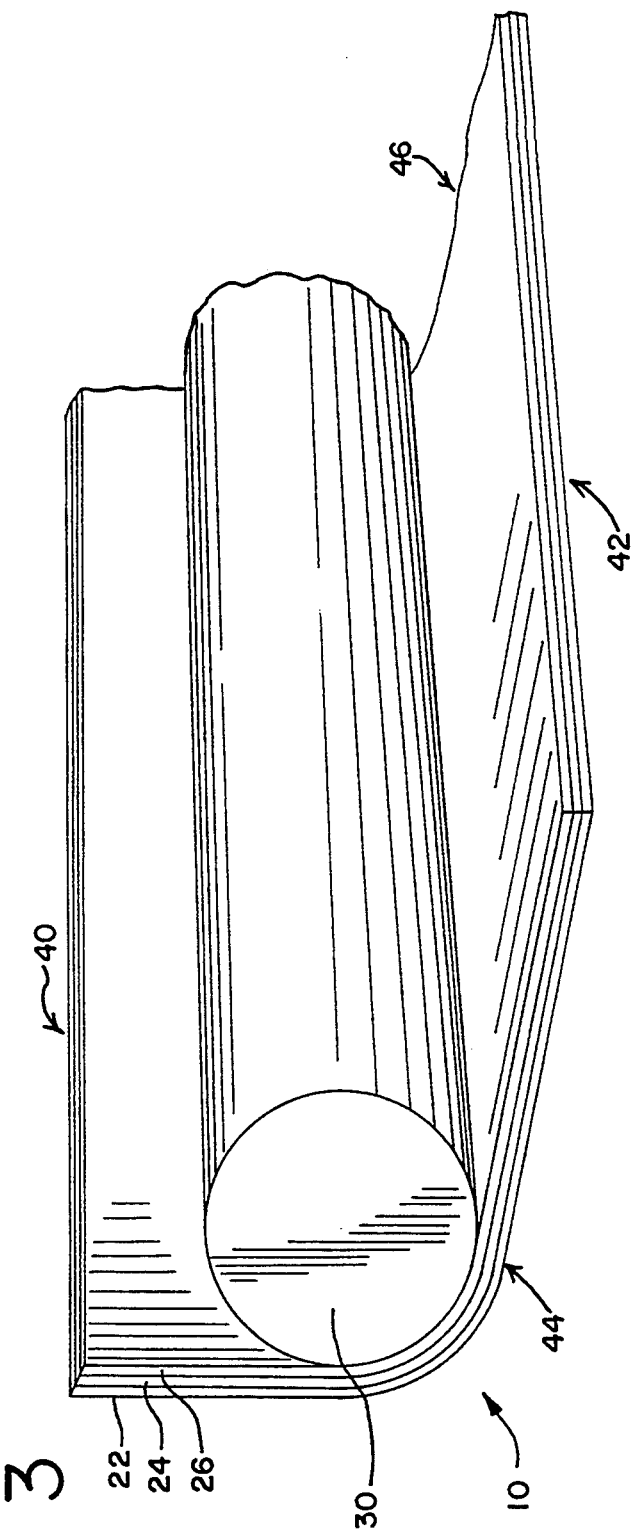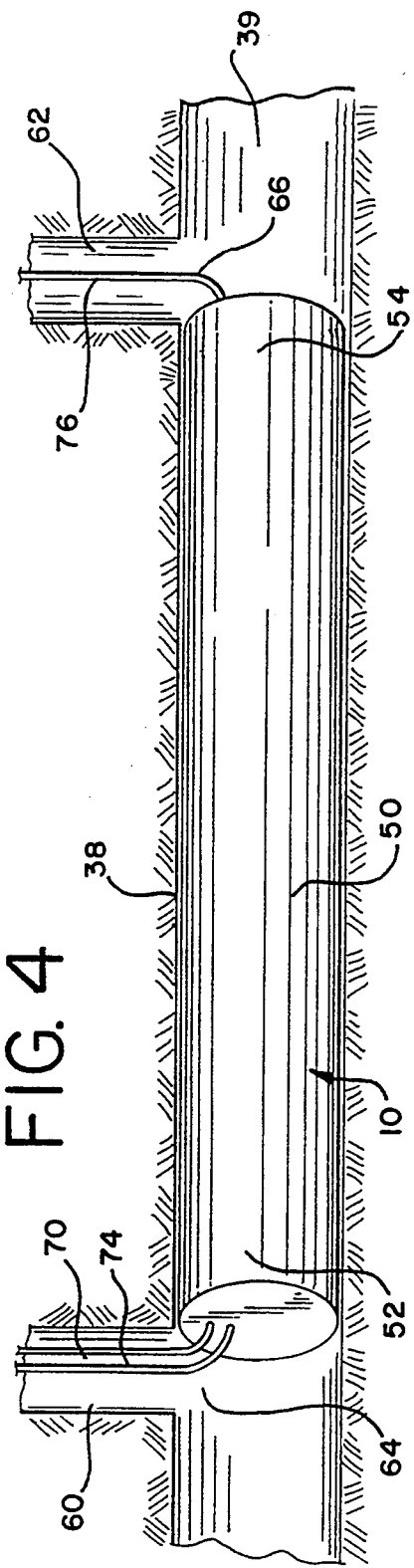

METHOD FOR REHABILITATING A PIPE WITH A LINER HAVING AN ELECTRICALLY CONDUCTIVE LAYER

DESCRIPTION

1. Technical Field The present invention generally relates to a shaped fibre reinforced composite, and method of forming same, and, more particularly, to a pipe liner and a method for rehabilitating a damaged or deteriorated pipe.

2. Background Prior Art A shaped part, made from a fibre reinforced plastic composite, such as a fiberglass boat hull, is typically formed by impregnating the composite with a resin in a mold while ambient heat cures the resin. This has traditionally been done in an open mold, an extremely expensive device, which can take up to 24 hours to cure the resin matrix composite. Hence, prior to the development of the present invention, a need existed for shortening resin cure times by eliminating expensive open molds.

U.S. Pat. No. 4,560,428 (Sherrick) discloses a system and method for producing a composite or laminate applicable for repairing damage to a structural component. An electrical resistance heating element in the form of a layer of graphite fibres is provided in contact with, or forming part of, a patch comprising a heat curable resinous material. A heat bondable adhesive film is positioned between the structural component and the patch. Electrical resistance is then used to cure the resin and bond the patch to the structural component.

Fibre reinforced plastic composites can also be used in rehabilitating damaged sewer pipe lines. The prior art contains many linings and methods for rehabilitating pipe lines. These range from excavating and replacing damaged sections of pipe to inserting smaller diameter pipes into the damaged sections. There are also several methods directed to providing various linings which may be inserted into the damaged pipes, some of which contain a resin which is subsequently cured to form a hardened shell lining the pipe.

A method disclosed in U.S. Pat. No. 4,768,562 (Strand) comprises pulling an elastomeric tube through a damaged pipe. The elastomeric tube has a diameter substantially equal to the inner diameter of the pipe and is encompassed by an electrically conductive resinated fibre lattice that radially contracts when axially elongated. The elastomeric tube and resinated fibre lattice are axially tensioned, whereby the maximum diameter of the liner is elastically reduced by the resultant elongation thereof. The resin is then partially polymerized so that the liner is maintained in such condition. After being pulled through the pipe, an electric current is directed through the resinated fibre lattice, thus softening the resin by electrical resistance heating. The elastomeric tube, no longer restrained by the resinated fibre lattice, resiliently expands radially outwardly until it resumes its prior shape. The liner is further heated electronically so as to completely polymerize the resin, thereby bonding the liner to the inner wall of the damaged pipe. Thus, the elastomeric tube is used to position the resinated fibre lattice within the pipe and the polymerized resin is used to secure the elastomeric tube to the inner wall. Strand postulates using a metallic fibre lattice to conduct the electrical current through the lining. The fibre lattice only expands as far as the elastomeric tube. Thus, unwanted gaps between the pipe and the lining may exist in areas if the pipe does not have a constant diameter.

Certain lightweight materials, such as graphite or Kevlar ®, known for their ability to greatly strengthen cured composites have not been used in pipe liners due to their large per pound expense.

Hence, prior to development of the present invention, a need existed for forming composites reinforced and strengthened with a lightweight material, such as graphite, and for curing these composites in less time and at less expense than in previous methods.

SUMMARY OF THE INVENTION

The broad aspects of the present invention involve a method of curing a preformed molded composite comprising an electrically conductive layer, such as woven graphite fibre. The method comprises the steps of impregnating the composite with a resin and compressing the composite in a mold while inducing an electric current through the conductive layer sufficient to raise the temperature of the conductive layer by electrical resistive heating to cure the resin. The electrically conductive layer is embedded within the composite, thus the composite is heated from within. In this manner, an exothermic reaction occurs in the resin more rapidly than a composite which is heated from its outside surface. In fact, the time required to cure the resin is about one-half the time required if the composite was heated from an external source.

Specific applications of the present invention are comprehended for curing preshaped fibre reinforced boat hulls, tennis rackets, golf club shafts, decks, and structural or exterior parts of automobiles, trucks, or recreational vehicles.

Another application of the broad aspects of the present invention is for providing a lining, and a method for in situ rehabilitating, a damaged or deteriorated pipe section.

According to the method for rehabilitating and lining a damaged or deteriorated pipe, a composite tube comprising a conductive layer, such as woven graphite fibre, is formed around a tubular shaped expandable bladder, such as polyurethane. Next, the lining is impregnated with a resin so that the conductive layer forms an internal heating element. The lining and the bladder are positioned along an interior section of a hollow pipe line having a substantially tubular shaped interior wall. The bladder is then inflated so that the lining is pressed against the interior wall. Finally, an electrical current is induced through the conductive layer. The electrical current is sufficient to resistively heat the conductive layer to cause the resin impregnated within the lining to cure. This cure binds the lining to the interior wall of the pipe line and to the bladder, thus forming a strong reinforced waterproof shell within the damaged pipe.

If woven graphite fibre is used as the conductive layer, it may be coated with copper or other suitable materials to increase its ability to generate resistive heat. Also, in addition to assisting in the curing of the impregnated resin, woven graphite fibre provides other beneficial properties which enhance the life span of the composite. Graphite fibre exhibits strength exceeding that of high-strength steels. Under fatigue loading, graphite fibre has virtually unlimited life. Additionally, when added to a matrix material, graphite fibre reduces the coefficient of friction and increases wear resistance. Also, graphite fibre is inert to a wide variety of chemicals. Composites made with graphite fibre are approximately 40% lighter than aluminum, they are stiffer than titanium and can be designed to have a zero coefficient of thermal expansion. Additionally, graphite composites have excellent structural damping compared to metals.

Also, additional layers of fibres or fabrics may be added to the composite to further reinforce and strengthen the lining, creating a hybrid advanced composite preform.

Other advantages and aspects of the invention will become apparent upon making reference to the specification, claims and drawings to follow.

BRIEF DESCRIPTION OF DRAWINGS

FIG. 1 discloses a perspective section taken through one embodiment of a pipe liner made in accordance with the present invention;

FIG. 2 discloses a perspective section taken through another embodiment of a pipe liner made in accordance with the present invention;

FIG. 3 discloses a perspective view of the partially formed pipe liner of FIG. 1;

FIG. 4 is a diagrammatic illustration of the pipe liner of FIG. 1 positioned inside a pipe section;

DETAILED DESCRIPTION

Figure 5:
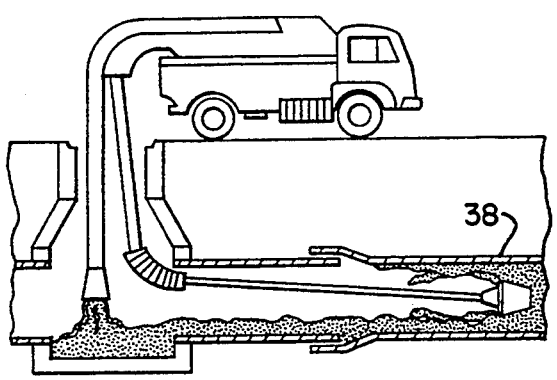
FIG. 5 is a diagrammatic illustration of a pipe section being cleaned.

While this invention is susceptible of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

A first embodiment of the present invention involves forming a lining for rehabilitating damaged or deteriorated pipe sections, and a method of use. As shown in FIG. 1, a lining, generally designated 10, used for rehabilitating a damaged or deteriorated pipe (FIG. 4) in situ comprises a woven graphite fibre reinforced composite 20 surrounding a bladder 30.

One pound of graphite can be formed into approximately two to three square yards of a woven fibre fabric while still retaining considerable strength. Using graphite in this form is cost effective, especially in view of the potentially enhanced life span of a product reinforced with graphite.

The composite 20 includes a first layer of polyester 22, a layer of woven graphite fibre 24, and a second layer of polyester 26. The woven graphite fibre layer 24 separates and spaces apart the first polyester layer 22 and the second polyester layer 26. These layers 22,24,26 are subjected to a spun bonded needle punch operation which mechanically binds and interlocks the layers 22,24,26 into a single fabric.

The bladder 30 is formed in a tubular shape having a hollow interior and opposing ends 32,34 spaced apart a distance approximately equal to a length of a section 38 of pipe 39 which is to be rehabilitated. The bladder 30 is preferably made out of a flexible material, such as polyurethane.

A rectangular portion of the composite 20, shown partially folded around the bladder 30 in FIG. 3, having opposing sides 40,42 and opposing ends 44,46 is cut from the composite fabric. The ends 44,46 are spaced apart a distance approximately equal to the length of the section 38 of pipe which is to be rehabilitated. The sides 40,42 are spaced apart a distance slightly farther than the circumference of the pipe line section 38.

The rectangular portion of composite 20 is formed into a tubular shaped section 50 surrounding the bladder 30 by connecting side 40 to side 42, as by seaming or stitching. The tubular shaped section 50 having ends 52,54 will thus have a circumference and diameter approximately equal to the circumference and diameter of the pipe line section 38.

When the composite 20 is formed into the tubular shaped section 50, the first polyester layer 22 becomes the outer layer of the tube. Similarly, the second polyester layer 26 becomes the inner layer of the tube, with the graphite fibre layer 24 being contiguously disposed between the outer and inner polyester layers.

To form the lining 10, the tubular section 50 surrounding the bladder 30 is first given a bath with a two part thermal setting resin system in a resin impregnator. The two part thermal resin system comprises an A-side resin combined with a B-side hardener. In order to prevent gaps forming between the lining 10 and the pipe line section 38, it is important to use a resin system which will not contract or shrink when cured, such as an epoxy resin system. Additionally, the resin system should be hydrophobic (i.e., it will set up in water), chemically resistant and have a sufficient pot life. The pot life corresponds to the time it takes the resin system to begin to harden after it has been impregnated into the composite. The pot life should be long enough to allow the lining to be positioned inside a pipe as explained below.

A two part thermosetting resin system having the properties mentioned is preferably made having equal parts of a blended diluent polyamide A-side and a blended aliphatic polyamine B-side. The A side is a blend of 75% EPOTUF ® epoxy resin 37-127 and 25% EPOTUF ® epoxy resin 37-137, which can be obtained through Reichhold Chemicals, Inc. located in Pensacola, Fla. The B-side is a blend if 33% EPOTUF ® epoxy hardener 37-360, 33% EPOTUF ® epoxy hardener 37-607, and 33% EPOTUF ® epoxy hardener 37-614, also available through Reichhold Chemicals, Inc.

Figure 6:
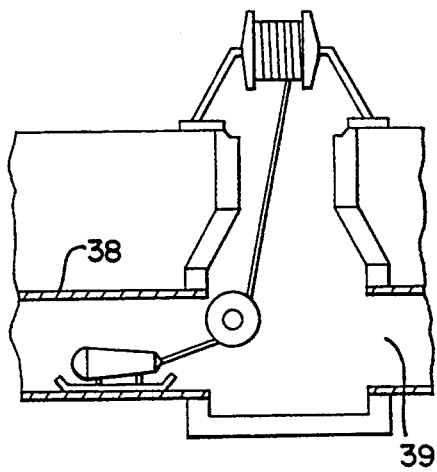
FIG. 6 is a diagrammatic illustration of an inspection camera being pulled through the pipe section.

Before placing the lining 10, access tunnels 60,62 must be created, if no existing tunnels such as those found in some sewer lines are present, at both ends 64,66 of the damaged pipe section 38. As shown in FIG. 5, the damaged pipe section 38 is then cleaned, as by pressure flushing. Next, the pipe section 38 is inspected, and lateral pipe lines, if any exist, are located with remote control television cameras shown in FIG. 6.

Figure 7:
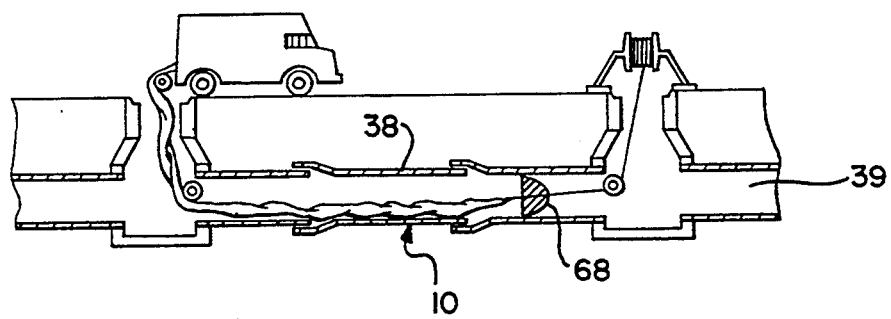
FIG. 7 is a diagrammatic illustration of the pipe liner of FIG. 1 being positioned within a pipe section.

The resin impregnated lining 10 is then pulled through and positioned within the interior of the pipe line section 38. A closed cell foam plug 68, shown in FIG. 7, is pulled in front of the lining 10 to further clean the pipe section 38 and to drive any water out of the pipe section.

Figure 8:
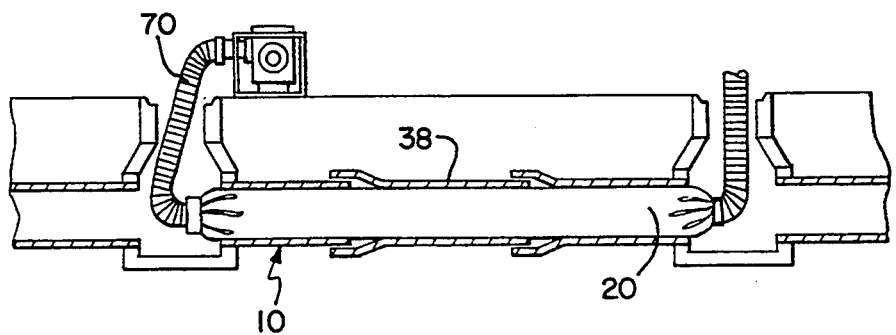
FIG. 8 is a diagrammatic illustration of the pipe liner of FIG. 1 inflated.

Once through the pipe section 38, the closed cell foam plug 68 is inserted into the bladder 30 and the end 34 is connected by a hose 70 to an air compressor (not shown). The bladder 30 is inflated with compressed air, forcing the plug 68 back through the bladder 30 and causing the bladder 30 to expand radially. This drives out any water which has seeped in between the pipe section 38 and the lining 10 while the lining 10 was being positioned within the pipe section 38. The bladder 30 is allowed to expand until the composite 20 is pressed firmly against the inner wall of the pipe section 38 as shown in FIG. 8. Since the composite 20 is primarily polyester and woven graphite fibre, the composite 20 has the ability to locally stretch or expand. This property is important because the diameter of the inner wall of a pipe section may vary by as much as 10% along the length of the pipe section. The ability of composite 20 to stretch will insure that there will be contiguous contact, without any gaps, between the lining 10 and the inner wall of the pipe section. Once the plug 68 is through the bladder 30, the end 32 of the bladder 30 is sealed closed.

While the composite 20 is confined between the inner wall of the pipe line section 38 and the inflated bladder 30, power lines 74,76 coupled to a conventional power source (not shown) capable of producing an electrical current are connected at the ends 52,54 to the woven graphite fibre layer 24 to create an electrical circuit. The power source induces an electrical current (or causes an electrical current to flow) through the woven graphite fibre layer 24. The current is increased to a level where heat generated by electrical resistance in the woven graphite fibre layer 24 is sufficient to cure or to enhance curing of the resin impregnated in the composite 20.

The current amount necessary to heat the composite to a sufficient temperature to cure the impregnated resin will depend on a variety of factors. For instance, the size of the composite (length, circumference, surface area), the ambient temperature of the composite and pipe section, and the type of resin being used, are all factors which will influence the amount of current needed. Even the weave of the graphite fibre can affect the amount of current.

In laboratory testing, a piece of fabric, constructed from graphite fibre, three feet in length and one foot wide produced the following current and temperatures when various voltages were applied to it:

| Voltage (Volts) | Current (Amps) | Temperature (°F.) |
| --- | --- | --- |
| 5.00 | 9.50 | 86.20 |
| 7.50 | 14.00 | 103.80 |
| 10.00 | 18.00 | 126.60 |
| 12.50 | 24.00 | 150.50 |
| 15.00 | 29.00 | 186.50 |
| 17.50 | 35.00 | 218.50 |
| 20.00 | 41.00 | 253.00 |

The resin goes through several distinct phases when heated. Initially the resin will form a gel, it then enters a tack-free phase and finally goes into a hardened cured phase. After reaching the tack-free phase, an exothermic reaction occurs and the resin will be sufficiently rigid and will no longer need to be heated to reach the hardened cured phase. Therefore, both the air compressor and the power source may be disconnected from the lining 10 at this time. After two hours, the resin will enter its final hardened cured phase.

The exothermic reaction occurs when the resin mass is heated to a specific temperature. At this point the resin begins to heat itself and does not require additional heating. It has been found that when the heating element is positioned internally, that is, within the resin impregnated composite, this specific temperature is reached more quickly and the resulting cure time is approximately one-half the cure time associated with externally heating the composite.

It is possible, depending on the approximate temperature achievable for a given set of conditions (e.g. length and surface area of lining, power source available), to formulate resins which have a suitable curing temperature.

During the curing process the composite 20 is bound on its outer surface to the inner wall of the pipe line section 38 and on its inner surface to the bladder 30 to form a hard strong graphite reinforce waterproof lining 10 within the pipe section 38. The resin used must not shrink or contract during this process in order to avoid gaps forming between the interior wall of the pipe section 38 and the lining 10.

Once the lining 10 is cured, the end 32 of the bladder 30 is reopened. Remote control television cameras are used to relocate any lateral pipes discovered when inspecting the pipe section 38. The lateral pipes are reopened utilizing conventional, remote control cutters.

In another embodiment shown in FIG. 2, additional layers, such as a vitreous fibre layer, may be sandwiched between the first polyester layer and the second polyester layer of the composite. The vitreous fibre provides additional strength and reinforcement to the lining 10.

The lining 10 described may also be used to repair and reinforce other structures, such as sewer access tunnels.

Another embodiment of the broader aspects of the present invention involves a method of curing a shaped part made from a graphite fibre reinforced composite plastic, such as a boat hull. A composite comprising a layer of woven graphite fibre surrounded on both sides by several layers of fiberglass is preformed into the shape of a boat hull. The composite is then thoroughly impregnated with a resin. The resin impregnated composite is placed into an open or compression mold. The composite is electrically coupled to a power source at opposing ends to create an electrical circuit. While the composite is being laid up or compressed in the mold, the power source is operated to induce an electrical current through the woven graphite fibre layer. The current is increased until heat generated by electrical resistance in the woven graphite fibre layer cures the resin impregnated within the object.

The mold which compresses and holds the composite during the curing process can be a polyester resin mold which costs far less than the thermal compression molds currently being used. Using this method, the boat hull can be cured in approximately 2 hours as opposed to the approximately 24 hours needed with the thermal compression mold.

While the specific embodiments have been illustrated and described, numerous modifications come to mind without significantly departing from the spirit of the invention and the scope of protection is only limited by the scope of the accompanying claims.

I claim:

1. A method for rehabilitating a pipe comprising the steps of:

providing a tube of lining around a tubular shaped bladder comprising polyurethane, said lining having a first end and an opposing second end, said lining further having an outer layer comprising polyester, and an inner layer comprising polyester being positioned adjacent said bladder, and a layer of woven graphite fiber disposed between said outer polyester layer and said inner polyester layer;

impregnating said lining with a resin;

positioning said lining and said bladder along an interior section of a hollow pipe line having a substantially tubular shaped interior wall;

inflating said bladder so that said lining is urged against said interior wall;

providing a source of electrical power;

coupling said source to said layer of woven graphite fiber at said first end of said tube of lining through a first power line and coupling said source to said layer of woven graphite fiber at said second end of said tube of lining through a second power line; and causing an electrical current to flow through said woven graphite fiber layer sufficient to resistively heat said woven graphite fiber layer to enhance curing of said resin impregnated within said lining.

2. The method of claim 1 further comprising the step of providing a vitreous fibre layer positioned between said inner polyester layer and said outer polyester layer of said lining.

3. The method of claim 1 wherein said resin comprises an epoxy.

4. A method for rehabilitating and lining a pipe comprising the steps of:

providing a tube of lining around a tubular shaped inflatable bladder, said lining having a first end and an opposing second end, said lining comprising a conductive woven graphite fiber layer;

impregnating said lining with a resin;

positioning said lining and said bladder along an interior section of a hollow pipe line having a substantially tubular shaped interior wall;

inflating said bladder so that said lining is urged against said interior wall;

providing a source of electrical power;

coupling said source to said woven graphite fiber layer at said first end of said tube of lining through a first power line and coupling said source to said woven graphite fiber layer at said second end of said tube of lining through a second power line; and causing an electrical current to flow through said woven graphite fiber layer sufficient to resistively heat said woven graphite fiber layer to enhance curing of said resin impregnated within said lining.

5. The method of claim 4 wherein said resin comprises an epoxy resin.

6. The method of claim 4 wherein said inflatable bladder comprises polyurethane.

7. A method of rehabilitating a pipe comprising the steps of:

providing a tube of lining having a first end and an opposing second end, said lining comprising a conductive woven graphite fiber layer and a bladder;

impregnating said lining with a resin;

positioning said tube of lining along an interior section of a hollow pipe having an interior wall;

urging said lining against said interior wall;

providing a source of electrical power;

coupling said source to said woven graphite fiber layer at said first end of said tube of lining through a first power line and coupling said source to said woven graphite fiber layer at said second end of said tube of lining through a second power line; and causing an electric current to flow through the woven graphite fiber layer to resistively heat said woven graphite fiber layer to enhance curing of said resin impregnated in said lining.

8. The method of claim 7 wherein said lining is urged against said interior wall of the pipe by inflating said bladder positioned inside said tube of lining.

9. The method of claim 8 wherein said bladder comprises polyurethane.

10. A method of rehabilitating a pipe comprising the steps of:

providing a lining having a first layer of polyester, a second layer of polyester and a conductive layer of woven graphite fiber disposed between said first layer and said second layer;

needle punching said layers to mechanically bind and interlock said layers;

forming said layers into a tubular shape having a first end and a second end, said tubular shape comprising a bladder;

impregnating said lining with a heat curable resin;

positioning said lining along an interior section of a hollow pipe having an interior wall;

inflating the bladder to urge said lining against said interior wall;

providing a source of electrical power;

coupling said source to said layer of woven graphite fiber at said first end of said tube of lining through a first power line and coupling said source to said layer of woven graphite fiber at said second end of said tube of lining through a second power line; and causing an electric current to flow through said power lines and said conductive layer to resistively heat said conductive layer to enhance curing of said resin impregnated in said lining.

11. The method of claim 10 wherein said bladder comprises polyurethane.

12. A method of rehabilitating a pipe comprising the steps of:

providing a tube of lining extending lengthwise from a first end to an opposing second end, said lining comprising a conductive woven graphite fiber layer and a bladder;

impregnating said lining with a resin;

positioning said tube of lining along an interior section of a hollow pipe having an interior wall;

urging said lining against said interior wall;

providing a source of electrical power;

coupling said source to said woven graphite fiber layer only at a first end position through a first power line and coupling said source to said woven graphite fiber layer only at a second end position spaced lengthwise from said first end position through a second power line; and causing an electric current to flow through the woven graphite fiber layer from said first power line to said second power line to resistively heat said woven graphite fiber layer to enhance curing of said resin impregnated in said lining.

13. The method of claim 12 wherein said lining is urged against said interior wall of the pipe by inflating said bladder positioned inside said tube of lining.

14. The method of claim 13 wherein said bladder comprises polyurethane.

* * * * *